US006803942B2

United States Patent
Sato et al.

(10) Patent No.: US 6,803,942 B2
(45) Date of Patent: Oct. 12, 2004

(54) LIGHT SCANNING DEVICE AND IMAGE FORMING APPARATUS USING THE SAME

(75) Inventors: Hiroshi Sato, Tochigi (JP); Manabu Kato, Tochigi (JP); Hidekazu Shimomura, Kanagawa (JP); Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/158,887

(22) Filed: Jun. 3, 2002

(65) Prior Publication Data

US 2003/0025784 A1 Feb. 6, 2003

(30) Foreign Application Priority Data

Jun. 8, 2001 (JP) ........................................ 2001-174433

(51) Int. Cl.[7] .............................................. G02B 26/08
(52) U.S. Cl. ...................................... 347/259; 359/206
(58) Field of Search ................................ 347/258, 259; 355/52; 359/205, 206, 207, 662; 399/218

(56) References Cited

U.S. PATENT DOCUMENTS

| 5,111,219 A | 5/1992 | Makino ...................... 347/259 |
| 5,619,362 A | 4/1997 | Ota ........................... 359/205 |
| 5,883,732 A | 3/1999 | Takada et al. .............. 359/207 |
| 2003/0053185 A1 | 3/2003 | Shimomura et al. ........ 359/197 |

FOREIGN PATENT DOCUMENTS

| JP | 4-50908 | 2/1992 |
| JP | 7-174998 | 7/1995 |
| JP | 9-33850 | 2/1997 |

OTHER PUBLICATIONS

Frank Cost, Pocket Guide to Digital Printing, 1997, Delmar publishers, pp. 102–105.*

* cited by examiner

*Primary Examiner*—Juanita Stephen
*Assistant Examiner*—Blaise Mouttet
(74) *Attorney, Agent, or Firm*—Fitzpatrick, Cella, Harper & Scinto

(57) ABSTRACT

It is an object of this invention to provide a light scanning device capable of suppressing a scanning line bend to a low level, which is caused by the arrangement error of a single-element lens serving as an imaging optical element, and an image forming apparatus using the device. In order to achieve the object, according to this invention, an imaging optical system is formed from a single-element lens, and a sectional shape of an exit surface in the main scanning direction is an arcuated shape. The power in the sub scanning direction substantially concentrates on the exit surface having an arcuated sectional shape in the main scanning direction, and the arcuated shape (curvature) in the main scanning direction is so determined as to make the magnification in the sub scanning direction uniform.

32 Claims, 16 Drawing Sheets

FIG. 4

DESIGN DATA

| | | | SURFACE SHAPE OF TORIC LENS (MAIN-SCANNING) | | SURFACE SHAPE OF TORIC LENS (SUB SCANNING) | | |
|---|---|---|---|---|---|---|---|
| | | | FIRST SURFACE | SECOND SURFACE | | FIRST SURFACE | SECOND SURFACE |
| WAVE LENGTH, REFLACTION FACTOR | | | | | | | |
| USED WAVE LENGTH | λ (mm) | 780 | R | 4.27400E+02 | −9.47135E+01 | r | ∞ | −2.35613E+01 |
| REFLACTION FACTOR OF TORIC LENS | nd | 1.53064 | K | 3.71366E+00 | 0.00000E+00 | D2s | 0.00000E+00 | 6.33197E−05 |
| ABBE NUMBER OF TORIC LENS | νd | 55.5 | B4 | −1.85091E−07 | 0.00000E+00 | D4s | 0.00000E+00 | 2.50292E−09 |
| LIGHT RAY ANGLE | | | B6 | 3.44576E−11 | 0.00000E+00 | D6s | 0.00000E+00 | −3.34091E−13 |
| POLYGON INCIDENCE ANGLE | θp | 90.0 | B8 | −6.82420E−15 | 0.00000E+00 | D8s | 0.00000E+00 | 1.43974E−16 |
| POLYGON MAXIMUM EXIT ANGLE | θe | 40.9 | B10 | 7.10650E−19 | 0.00000E+00 | D10s | 0.00000E+00 | 0.00000E+00 |
| ARRANGEMENT | | | | | | D2e | 0.00000E+00 | 6.33197E−05 |
| POLYGON SURFACE-TORIC LENS FIRST SURFACE | e1 | 51.45 | | | | D4e | 0.00000E+00 | 2.50292E−09 |
| CENTRAL THICKNESS OF TORIC LENS | d1 | 17.90 | | | | D6e | 0.00000E+00 | −3.34091E−13 |
| TRIC LENS SECOND SURFACE-SURFACE TO BE SCANNED | e2 | 147.28 | Suffics s: LASER SIDE | | | D8e | 0.00000E+00 | 1.43974E−16 |
| EFFECTIVE SCANNING WIDTH ON SURFACE TO BE SCANNED | W | 214.00 | Suffics e: ANTI-LASER SIDE | | | D10e | 0.00000E+00 | 0.00000E+00 |
| OTHERS | | | | | | | | |
| MAIN SCANNING FOCAL LENS OF TRIC LENS | fm | 149.67 | | | | POWER RATIO OF SUB SCANNING | | |
| POLYGON SURFACE-SURFACE TO BE SCANNED | L | 216.63 | | | | φs2/φs | | 1.000 |
| L/fm | a | 1.45 | | | | | | |
| MAIN SURFACE INTERVAL | HH' | 11.88 | | | | | | |
| (L−HH')/fm | b | 1.37 | | | | | | |

FIG. 5

| | Principal | | | | Marg | | |
|---|---|---|---|---|---|---|---|
| | X | Y | D | D/N | X | Y | D | D/N |
| POLYGON SURFACE | 0.000 | −0.672 | | | 0.000 | 0.000 | | |
| R1 SURFACE | 51.451 | −0.672 | 51.451 | 51.451 | 53.363 | 46.177 | 70.569 | 70.569 |
| R2 SURFACE | 69.348 | −0.672 | 17.897 | 11.742 | 56.536 | 47.572 | 3.466 | 2.274 |
| IMAGE SURFACE | 216.630 | −0.001 | 147.2835 | 147.283 | 216.630 | 106.926 | 170.742 | 170.742 |

La0  63.193    Laθ    72.843
Lb0  147.283   Lbθ    170.742

Lbθ/Laθ * La0/Lab0   1.005704

FIG. 10

DESIGN DATA

WAVE LENGTH, REFLECTION FACTOR

| | | |
|---|---|---|
| USED WAVE LENGTH | λ (mm) | 780 |
| REFLECTION FACTOR OF TORIC LENS | nd | 1.53064 |
| ABBE NUMBER OF TORIC LENS | νd | 55.5 |

LIGHT RAY ANGLE

| | | |
|---|---|---|
| POLYGON INCIDENCE ANGLE | θp | 90.0 |
| POLYGON MAXIMUM EXIT ANGLE | θe | 40.9 |

ARRANGEMENT

| | | |
|---|---|---|
| POLYGON SURFACE–TORIC LENS FIRST SURFACE | e1 | 51.45 |
| CENTRAL THICKNESS OF TORIC LENS | d1 | 17.90 |
| TRIC LENS SECOND SURFACE–SURFACE TO BE SCANNED | e2 | 147.28 |
| EFFECTIVE SCANNING WIDTH ON SURFACE TO BE SCANNED | W | 214.00 |

OTHERS

| | | |
|---|---|---|
| MAIN SCANNING FOCAL LENS OF TRIC LENS | fm | 149.67 |
| POLYGON SURFACE–SURFACE TO BE SCANNED | L | 216.63 |
| L/fm | a | 1.45 |
| | HH' | 11.88 |
| MAIN SURFACE INTERVAL | | |
| (L−HH')/fm | b | 1.37 |

SURFACE SHAPE OF TORIC LENS (MAIN-SCANNING)

| | FIRST SURFACE | SECOND SURFACE |
|---|---|---|
| R | 4.27400E+02 | −9.47135E+01 |
| K | 3.71366E+00 | 0.00000E+00 |
| B4 | −1.85091E−07 | 0.00000E+00 |
| B6 | 3.44576E−11 | 0.00000E+00 |
| B8 | −6.82420E−15 | 0.00000E+00 |
| B10 | 7.10650E−19 | 0.00000E+00 |

Suffics s: LASER SIDE
Suffics e: ANTI-LASER SIDE

SURFACE SHAPE OF TORIC LENS (SUB SCANNING)

| | FIRST SURFACE | SECOND SURFACE |
|---|---|---|
| r | ∞ | −2.51836E+01 |
| D2s | 2.50000E+02 | 8.57437E−05 |
| D4s | 0.00000E+00 | 6.32619E−09 |
| D6s | 0.00000E+00 | 7.63855E−13 |
| D8s | 0.00000E+00 | 1.67725E−18 |
| D10s | 0.00000E+00 | 0.00000E+00 |
| D2e | 0.00000E+00 | 8.57437E−05 |
| D4e | 0.00000E+00 | 6.32619E−09 |
| D6e | 0.00000E+00 | 7.63855E−13 |
| D8e | 0.00000E+00 | 1.67725E−18 |
| D10e | 0.00000E+00 | 0.00000E+00 |

POWER RATIO OF SUB SCANNING

| φs2/φs | 0.929 |
|---|---|

FIG. 15

DESIGN DATA

| | | | SURFACE SHAPE OF TORIC LENS (MAIN-SCANNING) | | | SURFACE SHAPE OF TORIC LENS (SUB SCANNING) | | |
|---|---|---|---|---|---|---|---|---|
| | | | | FIRST SURFACE | SECOND SURFACE | | FIRST SURFACE | SECOND SURFACE |
| WAVE LENGTH, REFLECTION FACTOR | | | | | | | r | −2.18762E+01 |
| USED WAVE LENGTH | λ(mm) | 780 | R | 4.27400E+02 | −9.47135E+01 | D2s | ∞ | 4.08270E−05 |
| REFLACTION FACTOR OF TORIC LENS | nd | 1.53064 | K | 3.71366E+00 | 0.00000E+00 | D4s | 2.00000E+02 | −3.24392E−09 |
| ABBE NUMBER OF TORIC LENS | νd | 55.5 | B4 | −1.85091E−07 | 0.00000E+00 | D6s | 0.00000E+00 | 3.91748E−13 |
| LIGHT RAY ANGLE | | | B6 | 3.44576E−11 | 0.00000E+00 | D8s | 0.00000E+00 | −4.24578E−17 |
| POLYGON INCIDENCE ANGLE | θp | 90.0 | B8 | −6.82420E−15 | 0.00000E+00 | D10s | 0.00000E+00 | 0.00000E+00 |
| POLYGON MAXIMUM EXIT ANGLE | θe | 40.9 | B10 | 7.10650E−19 | 0.00000E+00 | D2e | 0.00000E+00 | 4.08270E−05 |
| ARRANGEMENT | | | | | | D4e | 0.00000E+00 | −3.24392E−09 |
| POLYGON SURFACE-TORIC LENS FIRST SURFACE | e1 | 51.45 | | | | D6e | 0.00000E+00 | 3.91748E−13 |
| CENTRAL THICKNESS OF TORIC LENS | d1 | 17.90 | | | | D8e | 0.00000E+00 | −4.24578E−17 |
| TRIC LENS SECOND SURFACE-SURFACE TO BE SCANNED | e2 | 147.28 | | | | D10e | 0.00000E+00 | 0.00000E+00 |
| EFFECTIVE SCANNING WIDTH ON SURFACE TO BE SCANNED | W | 214.00 | Suffics s: LASER SIDE  Suffics e: ANTI-LASER SIDE | | | | | |
| OTHERS | | | | | | | | |
| MAIN SCANNING FOCAL LENS OF TRIC LENS | fm | 149.67 | | | | | | |
| POLYGON SURFACE-SURFACE TO BE SCANNED | L | 216.63 | | | | POWER RATIO OF SUB SCANNING | | |
| L/fm | a | 1.45 | | | | | | |
| | HH' | 11.88 | | | | $\phi s2/\phi s$ | | 1.085 |
| MAIN SURFACE INTERVAL | b | 1.37 | | | | | | |
| (L−HH')/fm | | | | | | | | |

LIGHT SCANNING DEVICE AND IMAGE FORMING APPARATUS USING THE SAME

BACKGROUND OF THE INVENTION

1. Field of the Invention

The present invention relates to a light scanning device and an image forming apparatus using the same and, more particularly, to a light scanning device which is suitable for a laser beam printer or digital copying apparatus which has, for example, an electrophotographic process of reflecting/deflecting (deflecting/scanning) a light beam, optically modulated and emitted from a light source means, by using a deflecting element formed from a rotating polyhedral mirror or the like, and recording image information by optically scanning a surface to be scanned through an imaging optical system having f-θ characteristics.

2. Description of Related Art

In a conventional scanning optical device for a laser beam printer (LBP) or the like, the light beam which is optically modulated in accordance with an image signal and emitted from a light source means is cyclically deflected by a light deflector formed from, e.g., a rotating polyhedral mirror (polygon mirror), and the light beam is focused into a spot on the surface of a photosensitive recording medium (photosensitive drum) and optically scanned on the surface by an imaging optical system having f-θ characteristics.

FIG. 17 is a schematic view showing the main part of a conventional light scanning device.

Referring to FIG. 17, the divergent light beam emitted from a light source means 1 is converted into a substantially parallel light beam by a collimator lens 2, and the light beam is limited by a stop 3 to be incident on a cylindrical lens 4 having predetermined refracting power only in the sub scanning direction. Of the substantially parallel light beam incident on the cylindrical lens 4, the light in a main scanning cross-section emerges without any change. The light in a sub-scanning cross-section is focused and substantially formed into an almost line image on a deflecting surface (reflecting surface) 5a of a light deflector 5.

The light beam reflected/deflected by the deflecting surface 5a of the light deflector 5 is guided onto the photosensitive drum surface 8 serving as a surface to be scanned through an imaging optical system (f-θ lens system) 6 having f-θ characteristics. By rotating the light deflector 5 in the direction indicated by an arrow A, the photosensitive drum surface 8 is optically scanned to record image information.

In such a light scanning device, in order to record high-resolution image information, for example, the following requirements need to be satisfied. The curvature of the image surface is properly corrected throughout the surface to be scanned. Distortion characteristics (f-θ characteristics) with uniform velocity characteristics are set between a scanning angle θ and an image height Y. A spot diameter on the image surface at each image height is uniform. Conventionally, various types of light scanning devices that satisfy such optical characteristics or correction optical systems (f-θ lenses) have been proposed.

As laser beam printers and digital copying apparatuses have decreased in size and cost, similar requirements are imposed on light scanning devices.

As an arrangement that satisfies such requirements, a light scanning device having an f-θ lens formed from a single lens is disclosed in, for example, Japanese Patent Application Laid-Open Nos. 4-50908 and 9-33850.

According to Japanese Patent Application Laid-Open No. 4-50908, a high-order aspherical surface is used in the main scanning direction of an f-θ lens to relatively properly correct aberration characteristics. However, since the magnification in the sub scanning direction between a light deflector and a surface to be scanned is not uniform, the spot diameter in the sub scanning direction tends to change with a change in image height.

According to Japanese Patent Application Laid-Open No. 9-33850, the curvatures of at least two of the lens surfaces of an f-θ lens in the light scanning device in the sub scanning direction continuously change at the effective portion of an imaging lens along the main scanning direction independently of the curvature in the main scanning direction. This makes it possible to control the position of the principal plane in the sub scanning direction by bending the two surfaces and make the sub scanning magnification at each image height uniform, thereby making the spot diameter uniform.

In the above proposal, in order to make the sub scanning magnification uniform, the position of the principal plane is so controlled as to make the main scanning uniform by bending at least two surfaces. Although this allows completely independent setting of a main scanning shape and sub scanning shape, requirements such as suppression of an increase in lens thickness tend to make the lens shape in the main scanning direction have a relatively large aspherical surface amount.

A lens having a large aspherical surface amount in the main scanning direction like the one described above is subjected to considerable deteriorations in optical performance due to the arrangement errors of the respective lens surfaces and lens. Of the deteriorations in optical performance, a scanning line bend in the sub scanning direction, in particular, cannot be corrected by adjusting mirrors and the like arranged in the device body, unlike scanning line height deviation, scanning line inclination, and the like. This therefore poses a serious problem. In order to suppress a scanning line bend to a low level, the respective lens surfaces and the lens need to be arranged with high precision in accordance with design values or an adjusting mechanism needs to be provided for the lens to adjust the arrangement according to the design values.

In a color image forming apparatus in which light scanning devices are respectively arranged in correspondence with four photosensitive devices (photosensitive drums), and latent images are formed on them by laser beams to form Y (yellow), M (magenta), C (cyan), and Bk (black) original images on the corresponding photosensitive device surfaces, since the four color images, i.e., the Y, M, C, and Bk images, formed on the respective photosensitive device surfaces are superimposed on a transfer medium such as a paper sheet, if scanning lines of the light scanning devices corresponding to the respective photosensitive devices bend, errors are produced in the shapes of the scanning lines among four colors. This causes color misregistration on the image on the transfer medium, and hence results in a considerable deterioration in image quality.

FIG. 18 shows a scanning line moving amount on the surface to be scanned when a scanning optical element and each optical element surface are decentered (by 50 μm) in a direction (sub scanning direction) perpendicular to the main scanning direction in an embodiment disclosed in Japanese Patent Application Laid-Open No. 9-33850. As is obvious from FIG. 18, when an optical surface is decentered, a large scanning line bend occurs, and an improvement in arrangement precision or decentering adjustment is required to obtain a high-quality image.

Referring to FIG. 18, the R1 curve represents a scanning line bend amount when only the incident surface of an f-θ lens 6 is decentered in the sub scanning direction; the R2 curve, a scanning line bend amount when only the exit surface of the f-θ lens 6 is decentered; and the block curve, a scanning line bend amount when both the incident and exit surfaces of the f-θ lens 6 are decentered.

SUMMARY OF THE INVENTION

The present invention has been made to solve the above problems, and has as its object to provide a light scanning device which has an f-θ lens formed from a single lens, and can suppress a scanning line bend caused by the arrangement error of the lens to a low level by optimally shaping the f-θ lens, and an image forming apparatus using the device.

An object of the present invention is to provide a light scanning device having an imaging optical system for guiding a light beam emitted from light source means to a deflecting element, and forming the light beam deflected by the deflecting element into an image on a surface to be scanned, wherein the imaging optical system is formed from a single lens, a cross-sectional shape of an exit surface of the single lens in a main scanning direction is an arc shape, power of the exit surface in a sub scanning direction satisfies $0.9 \leq \phi s2/\phi s \leq 1.1$ where $\phi s$ is power of an overall imaging optical system in the sub scanning direction and $\phi s2$ is power of the exit surface in the sub scanning direction, and the arc shape in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of the single lens, $L_{bo}$ is a distance from the exit surface of the single lens to the surface to be scanned, $L_{a\theta}$ is an equivalent air distance from the deflecting means at an off-axis position to the exit surface of the single lens, and $L_{b\theta}$ is a distance from the exit surface of the single lens to the surface to be scanned.

In the present invention, it is preferable that the power of the exit surface in the sub scanning direction or/and the power of the incident surface in the sub scanning direction changes without correlating to a shape in the main scanning direction.

In the present invention, it is preferable that a radius of curvature of the exit surface in the sub scanning direction changes from an on-axis position to an off-axis position.

In the present invention, it is preferable that the incident and exit surfaces are anamorphic surfaces.

In the present invention, it is preferable that the shape of the incident surface in the main scanning direction is aspherical.

In the present invention, it is preferable that letting L be an optical path length of the imaging optical system, and f be a focal length, the optical path length and focal length satisfy $1.35f \leq L \leq 1.55f$.

In the present invention, it is preferable that, of the lens shape of the imaging optical system in the main scanning direction, there is no inflection point in a curvature change on a surface which uses an aspherical surface.

In the present invention, it is preferable that the imaging optical system is manufactured by plastic molding.

In the present invention, it is preferable that a multi-beam laser is used as a light source of the imaging optical system.

In the present invention, it is preferable that the power of the exit surface in the sub scanning direction satisfies $0.95 \leq \phi s2/\phi s \leq 1.05$ where $\phi s$ is power of the overall imaging optical system in the sub scanning direction and $\phi s2$ is power of the exit surface in the sub scanning direction.

In the present invention, it is preferable that the arc shape in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of the single lens, $L_{bo}$ is the distance from the exit surface of the single lens to the surface to be scanned, $L_{a\theta}$ is the equivalent air distance from the deflecting means at an off-axis position to the exit surface of the single lens, and $L_{b\theta}$ is the distance from the exit surface of the single lens to the surface to be scanned.

In the present invention, it is preferable that the shape of the exit surface of the single lens is an arc shape.

In the present invention, it is preferable that the shape of the incident surface of the single lens within a sub scanning cross-section is flat.

Further object of the present invention is to provide an image forming apparatus comprising above-described light scanning device, a photosensitive device placed on the surface to be scanned, a developing device for developing an electrostatic latent image formed on the photosensitive device by a light beam scanned by the light scanning device as a toner image, a transferring device for transferring the developed toner image onto a transfer medium, and a fixing device for fixing the transferred toner image on the transfer medium.

Further object of the present invention is to provide an image forming apparatus comprising above-described light scanning device, and a printer controller for converting code data input from an external device into an image signal, and inputting the signal to the light scanning device.

Further object of the present invention is to provide an image forming apparatus comprising a plurality of above-described imaging optical systems, each of the imaging optical systems recording image information on photosensitive devices corresponding to each color or a plurality of colors.

Further object of the present invention is to provide a light scanning device having an imaging optical system for guiding a light beam emitted from light source means to a deflecting element, and forming the light beam deflected by the deflecting element into an image on a surface to be scanned, wherein the imaging optical system is formed from a single lens formed by a molding process, a cross-sectional shape of an exit surface of the single lens in a main scanning direction is an arc shape, power of the exit surface in a sub scanning direction satisfies $0.9 \leq \phi s2/\phi s \leq 1.1$ where $\phi s$ is power of the overall imaging optical system in the sub scanning direction and $\phi s2$ is power of the exit surface in the sub scanning direction, and the arc shape in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of the single lens, $L_{bo}$ is a distance from the exit surface of the single lens to the surface to be scanned, $L_{a\theta}$ is an equivalent air distance from the deflecting means at an off-axis position to the exit surface of the single lens, and $L_{b\theta}$ is a distance from the exit surface of the single lens to the surface to be scanned.

BRIEF DESCRIPTION OF THE DRAWINGS

FIG. 4 is a view showing design data in the first embodiment;

FIG. 5 is a view showing the coordinates of light beams and light beam distances;

FIG. 10 is a view showing design data in the second embodiment;

FIG. 15 is a view showing design data in the third embodiment;

DETAILED DESCRIPTION OF THE PREFERRED EMBODIMENTS

In order to solve the problems in the present invention, it is important to make the sub scanning magnification of a scanning lens substantially uniform within an image effective area, and make the sub scanning magnification at each of the image heights of the incident and exit surfaces of the scanning lens substantially uniform.

When the entire scanning lens is decentered in a direction (Z direction) perpendicular to the surface to be scanned due to an error in mounting the lens in an optical box (housing) and the manufacturing error of the lens itself, the sub scanning magnification of the scanning lens is made substantially uniform to uniformly shift the scanning line on the surface to be scanned, thereby eliminating a scanning line bend due to the decentering.

In a molded lens, in particular, when the exit surface is decentered in the Z direction relative to the incident surface due to insufficient assembly precision in the mold, a scanning line bend due to the decentering on the surface to be scanned can be eliminated by making the sub scanning magnification on each surface of the scanning lens substantially uniform.

According to a specific method of achieving these effects, which is characteristic to the present invention, the exit surface of the scanning lens is made to have almost all the power in the sub scanning direction, and the shape of the exit surface of the scanning lens in the sub scanning direction is so determined as to make the sub scanning magnification substantially uniform within an image effective area.

Figure 3:
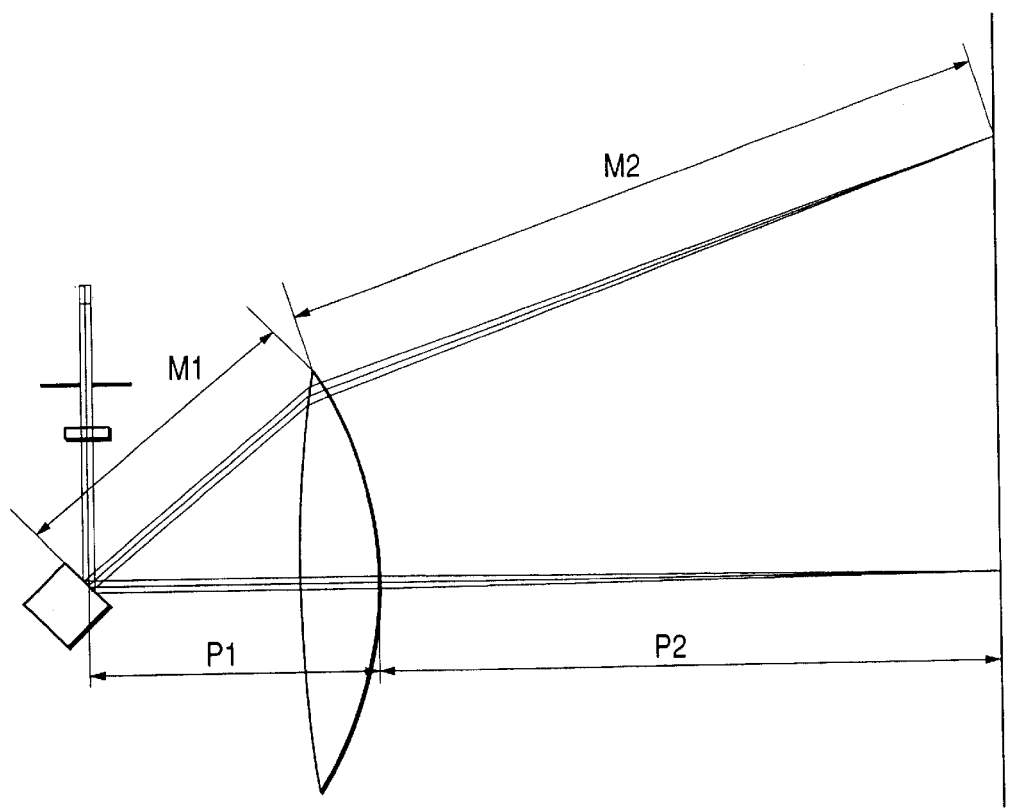
FIG. 3 is a view for explaining a main scanning shape that makes a sub scanning magnification uniform.

The main scanning shape which makes the sub scanning magnification uniform is the surface shape by which the ratio between the equivalent air distance (calculated in terms of real distance/refraction factor inside the lens) from the polygon deflecting surface to the scanning lens exit surface and the distance from the exit surface to the surface to be scanned is made substantially uniform, and corresponds to a substantially circular optical surface having a curvature center on the deflector side, as shown in FIG. 3. By setting almost all the power in the sub scanning direction on this surface, the sub scanning magnification of the scanning lens is made substantially uniform within the image effective area, and the sub scanning magnifications on the incident and exit surfaces are also made substantially uniform.

With this technique, a scanning optical system which can prevent a scanning line bend even if the overall scanning lens and each optical surface are decentered can be realized at low cost by using a single lens. This scanning optical device is especially suitable for a scanning optical system in a color image forming apparatus using a plurality of such devices. When the device is applied to this apparatus, an image with little color misregistration caused by a scanning line bend can be obtained without adjusting the scanning line bend.

First Embodiment

Figure 1:
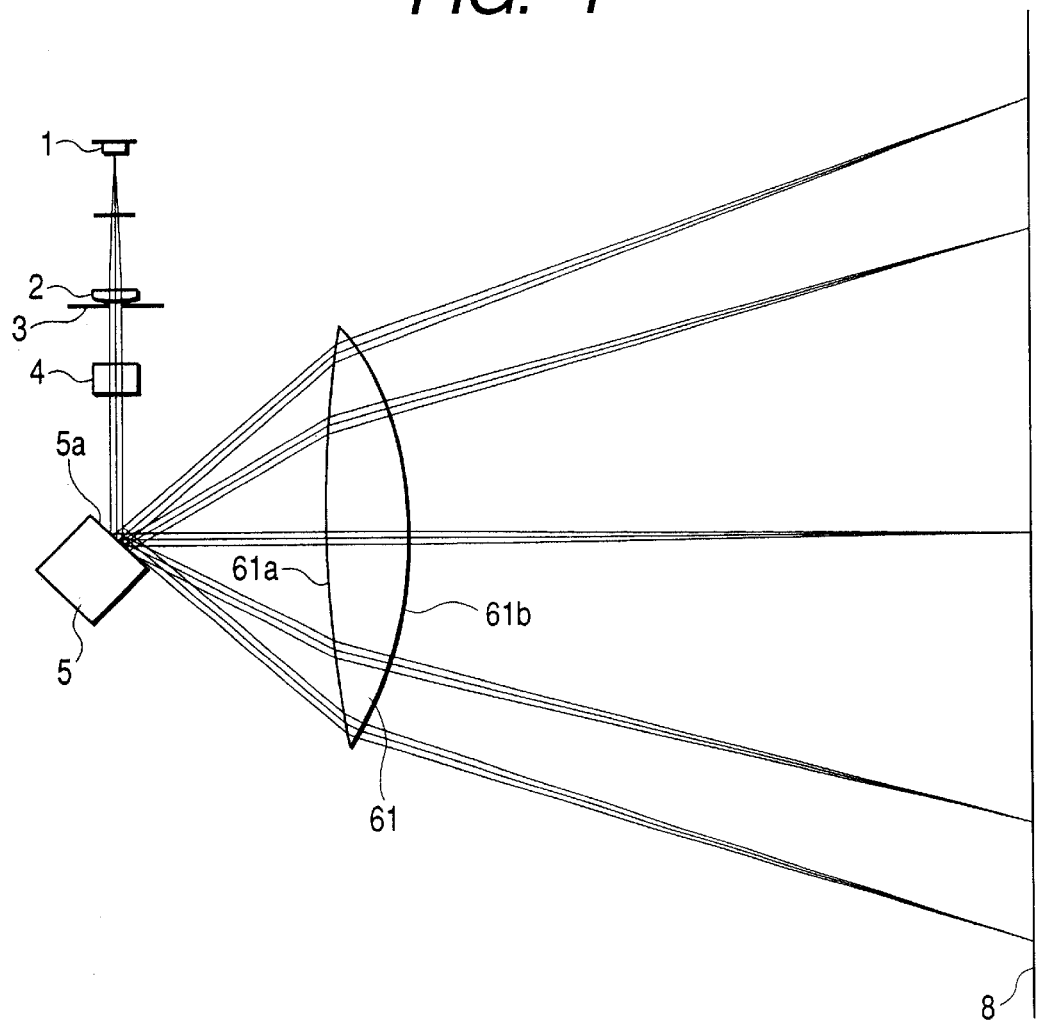
FIG. 1 is a sectional view showing the main part of the first embodiment according to the present invention in the main scanning direction.
Figure 2:
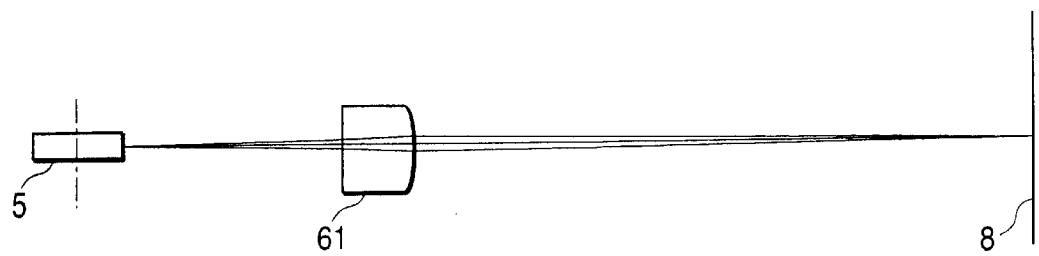
FIG. 2 is a sectional view showing the main part of the first embodiment according to the present invention in the sub scanning direction.

FIG. 1 is a sectional view (main scanning sectional view) of the main part of a light scanning device in the main scanning direction according to the first embodiment of the present invention. FIG. 2 is a sectional view (sub scanning sectional view) of the main part in the sub scanning direction in FIG. 1.

In this specification, a plane formed by the optical axis of a scanning optical means and the light beam deflected by a light deflector is defined as a main scanning cross-section, and a plane which includes the optical axis of the scanning optical means and is perpendicular to the main scanning cross-section is defined as a sub scanning cross-section.

Referring to FIG. 1, a light source means 1 is formed from, for example, a semiconductor laser. A collimator lens 2 converts the divergent light beam emitted from the light source means 1 into a substantially parallel light beam. An aperture stop 3 limits a passing light beam (light amount). A cylindrical lens 4 has a predetermined refracting power only in the sub scanning direction and forms a light beam passing through the aperture stop 3 into an almost line image on a deflecting surface 5a of a light deflector (deflecting element) 5 within a sub scanning cross-section.

Note that each of elements, e.g., the collimator lens 2, aperture stop 3, and cylindrical lens 4, serves as an element of an incident optical system.

The light deflector 5 serving as a deflecting element is formed from, for example, a polygon mirror (rotating polyhedral mirror). The light deflector 5 is rotated by a driving means (not shown) such as a motor at constant speed in a predetermined direction.

A scanning optical element (f-θ lens) 61 has f-θ characteristics, and is formed from a single lens having anamorphic surfaces on the two surfaces. The scanning optical element 61 is located closer to the deflector side than the midpoint between the light deflector 5 and a photosensitive drum surface 8 serving as the surface to be scanned.

The single lens in this embodiment is a plastic lens formed by a molding process.

The scanning optical element 61 in this embodiment is formed as follows. The first surface within a main scanning cross-section is an aspherical surface which has a convex surface facing the deflector and is expressed by functions up to a 10th-order function. The second surface is an arc surface having a convex surface facing the surface to be scanned. Within a sub scanning cross-section, the first surface is a flat surface, and the second surface is an arc surface whose convex surface faces the surface to be scanned and curvature continuously changes from an on-axis position to an off-axis position within the effective portion of the lens.

The scanning optical element 61 forms the light beam based on image information, which is reflected/deflected (deflected/scanned) by the light deflector 5, into an image on the surface 8 to be scanned.

The photosensitive drum surface 8 serves as the surface to be scanned. The light beam reflected/deflected by the deflecting surface 5a of the light deflector 5 is guided onto the photosensitive drum surface 8 via the scanning optical element 61. By rotating the light deflector 5 in a predetermined direction, the photosensitive drum surface 8 is optically scanned in a predetermined direction (main scanning direction). With this operation, an image is recorded on the photosensitive drum surface 8 as a recording medium.

In order to solve the above problems, the scanning optical element of the present invention has the following functions in the sub scanning direction:

the function of correcting the curvature of image surface and optical face tangle error in the sub scanning direction, the function of making the sub scanning magnification uniform, and the function of reducing the arrangement sensitivity of a scanning line bend.

The above three functions are conditions necessary for the scanning optical element to record a good image within an image effective area. By making the sub scanning magnification uniform, in particular, the Fno in the sub scanning direction with respect to a light beam incident on the surface to be scanned is made uniform, and the sub scanning spot diameter within the image effective area is made uniform. In a multi-beam scanning optical device, this function is required to make the intervals between adjacent scanning lines uniform. The imaging magnification difference (sub scanning Fno ratio) in the sub scanning direction within the image effective area needs to be suppressed to 10% or less, preferably 5% or less, in consideration of the practical use of the scanning optical device.

In addition, by reducing the arrangement sensitivity of a scanning line bend, the assembly precision required for the optical box (housing) and manufacturing precision required for the lens itself can be reduced.

According to the present invention, in order to implement these functions, a scanning optical element is formed from an anamorphic single lens, and the above items are realized by determining the shape of the exit surface of the scanning optical element so as to make the sub scanning magnification uniform, substantially concentrating the power in the sub scanning direction on the exit surface of the scanning optical element, and continuously changing the curvature of the exit surface of the scanning optical element in the sub scanning direction from an on-axis position to an off-axis position.

The main scanning shape which makes the sub scanning magnification uniform is the surface shape by which the ratio between an equivalent air distance P1 or M1 (calculated in terms of real distance/refraction factor inside the lens) from the polygon mirror surface (deflecting surface) to the exit surface of the scanning optical element and a distance P2 or M2 from the exit surface to the surface to be scanned is made substantially uniform, and corresponds to a substantially circular optical surface having a curvature center on the deflector side, as shown in FIG. 3. By setting almost all the power in the sub scanning direction on this surface, the sub scanning magnification of the scanning lens is made substantially uniform within an image effective area, and the sub scanning magnification on the exit surface is also made substantially uniform. The amount of variation in the ratio between the equivalent air distance from the polygon mirror surface (deflecting surface) to the exit surface of the scanning optical element and the distance from the exit surface to the surface to be scanned needs to be suppressed to 10% or less, preferably to 5% or less, in consideration of the practical use of the scanning optical device.

Both the curvature of the image surface in the sub scanning direction and the uniformity of sub scanning magnification (sub scanning magnification uniformity) in the entire scanning effective area on the surface 8 to be scanned can be simultaneously and properly corrected by only using the arrangement which concentrates the power in the sub scanning direction on the exit surface 61b of the scanning optical element 61 and continuously changes the sagittal radius of curvature with a distance from the optical axis in the main scanning direction.

In this case, the fluctuation amount of the deflecting surface during scanning due to the absence of a rotation center on the polygon mirror surface is small, and hence can be neglected.

In order to reduce the sensitivity of a scanning line bend, it is preferable that the power of the imaging optical system in the sub scanning direction substantially concentrate on one surface of the single lens. If the power in the sub scanning direction disperses on a plurality of optical elements or surfaces, the scanning line bends produced by the arrangement errors of the respective optical elements are accumulated. In addition, the scanning line bend produced by an optical element placed on the light deflector side may be amplified by the arrangement error of an optical element placed on side of the surface to be scanned. Therefore, the optimal method of reducing the sensitivity of a scanning line bend is the method of forming an imaging optical system by using a single lens and focusing the power in the sub scanning direction on one surface of the single lens. The concentration degree of power in the sub scanning direction needs to be 90% or more, preferably 95% or more, with respect to the total sub scanning power of the single lens in consideration of the practical use of the scanning optical device.

The surface of the single lens which has strong positive power in the sub scanning direction is preferably arcuated in a main scanning cross-section for the following reason. Assume that a lens has a large aspherical surface amount in a main scanning cross-section. In this case, when the lens is rotated on an axis in the main scanning direction, the height of a light beam incident on a surface having strong positive power in the sub scanning direction changes depending on the position in the main scanning direction. That is, the refracting power in the sub scanning direction changes depending on the position. As a consequence, a scanning line bend does not become a quadratic curve, and undulation occurs in the scanning line.

The surface of the single lens which has strong positive power in the sub scanning direction is preferably placed near the surface to be scanned. This is because the bend sensitivity of a light beam refracted by the strong positive power in the sub scanning direction is reduced with a decrease in the distance to the surface to be scanned.

In order to satisfy the above conditions and properly correct the curvature of the image surface in the main scanning direction and f-θ characteristics for uniform-velocity scanning, the design of a thin lens system must satisfy $$1.28f \leq L \leq 1.48f$$

where L is the optical path length of the imaging optical system and f is the focal length. When this condition is applied to the thin lens system, the following condition is preferably satisfied in consideration of the main surface interval.

$$1.35f \leq L \leq 1.55f$$

Furthermore, by continuously changing the curvature of the exit surface 61b of the scanning optical element in the sub scanning direction from an on-axis position to an off-axis position, the curvature of the image surface in the sub scanning direction is corrected, and the focal line formed on the deflecting surface 5a of the polygon mirror is formed again on the surface 8 to be scanned, thus forming an optical face tangle error correction optical system. In this case, since the shape of the exit surface 61b in the main scanning direction is so determined as to make the sub scanning magnification uniform, a change in curvature in the sub scanning direction is mostly used for the above object. Unlike the prior art, therefore, there is no need to use a change in curvature in the sub scanning direction to make the imaging magnification in the sub scanning direction uniform.

In this embodiment, the surface shape of the refracting surface of the scanning optical element is defined by the following shape expression. Provided that the intersection between each optical element surface and the optical axis is regarded as an origin, and the optical axis direction, a direction perpendicular to the optical axis within a main scanning cross-section, and a direction perpendicular to the optical axis within a sub scanning cross-section respectively correspond to the X-axis, the Y-axis, and the Z-axis, the meridional direction corresponding to the main scanning direction is expressed by $$X = \frac{Y^2/R}{1+(1-(1+K)(Y/R)^2)^{1/2}} + B_4 Y^4 + B_6 Y^6 + B_8 Y^8 + B_{10} Y^{10}$$

where R is the meridional radius of curvature, and K, $B_4$, $B_6$, $B_8$, and $B_{10}$ are aspherical coefficients.

The sagittal direction corresponding to the sub scanning direction (the direction which includes the optical axis and is perpendicular to the main scanning direction) is expressed by $$S = \frac{Z^2/r'}{1+(1-(Z/r')^2)^{1/2}}$$

for $1/r' = 1/r + D_2 Y^2 + D_4 Y^4 + D_6 Y^6 + D_8 Y^8 + D_{10} Y^{10}$ where r is the sagittal radius of curvature, and $D_2$, $D_4$, $D_6$, $D_8$, and $D_{10}$ are sagittal change coefficients.

Not that the sagittal radius of curvature r' at an off-axis position includes the normal to a meridional line at each position and is defined within a plane perpendicular to the main scanning plane. Although the polynomial in the shape expression is expressed by functions up to a 10-th order function, the order may be higher or lower than this.

FIG. 4 shows coefficients representing the aspherical coefficients of the scanning optical element 61 and other characteristics in this embodiment.

The scanning optical element 61 in this embodiment is formed from a single lens having anamorphic surfaces on the two surfaces. The first surface within a main scanning cross-section is an aspherical surface which has a convex surface facing the deflector. The second surface is an arc surface having a convex surface facing the surface to be scanned. Within a sub scanning cross-section, the first surface is a flat surface, and the second surface is an arc surface whose convex surface faces the surface to be scanned and curvature continuously changes from an on-axis position to an off-axis position within the effective portion of the lens.

FIG. 5 shows the coordinates of principal rays passing through the respective surfaces of the scanning optical element 61 and light beam distances from the deflecting surface 5a to the respective surfaces in this embodiment. These values are calculated on the basis of the intersection between the principal ray of incident light in scanning at the outermost off-axis position and the deflecting surface 5a which is regarded as the origin of an X-Y coordinate system. In the scanning optical element according to this embodiment, the equivalent air distance (calculated in terms of real distance/refraction factor inside the lens) from the deflecting surface 5a of the polygon mirror on the optical axis to the exit surface 61b of the scanning optical element 61 is given by $L_{ao}$=63.193 mm, the distance from the exit surface 61b of the scanning optical element 61 to the surface 8 to be scanned is given by $L_{bo}$=147.283 mm, the equivalent air distance from the deflecting surface 5a of the polygon mirror at an off-axis position to the exit surface 61b of the scanning optical element 61 is given by $L_{a\theta}$=72.843 mm, and the distance from the exit surface 61b of the scanning optical element 61 to the surface 8 to be scanned is given by $L_{a\theta}$=170.742 mm. The shapes of the two surfaces 61a and 61b (the exit surface 61b, in particular) in the main scanning direction are determined to satisfy the following conditions:

$$\frac{L_{b\theta}}{L_{a\theta}} = 1.0057 \times \frac{L_{bo}}{L_{ao}} \qquad (a)$$

$$0.9 \times \frac{L_{bo}}{L_{ao}} \leq \frac{L_{b\theta}}{L_{a\theta}} \leq 1.1 \times \frac{L_{bo}}{L_{ao}} \qquad (b)$$

Figure 6A:
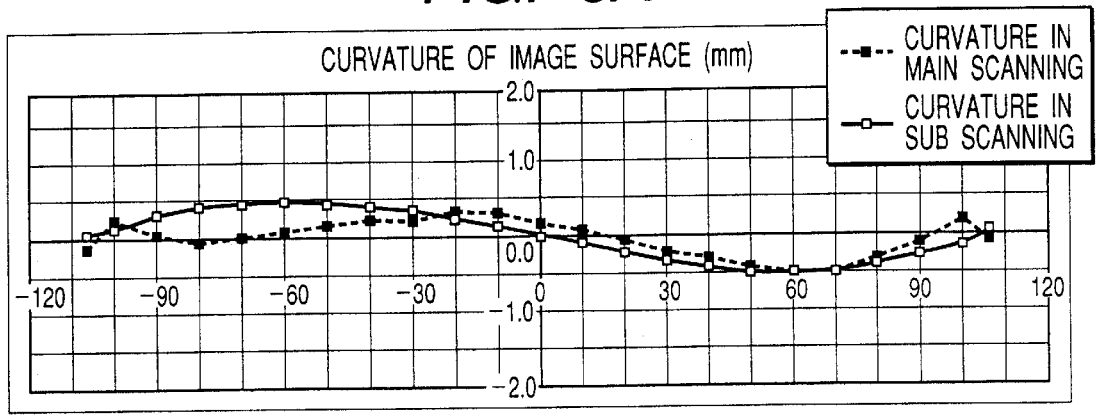
FIGS. 6A, 6B and 6C are aberration charts showing paraxial aberrations (curvature of image surface, distortive aberration, and magnification difference of sub scanning) in the first embodiment of the present invention.
Figure 6B:
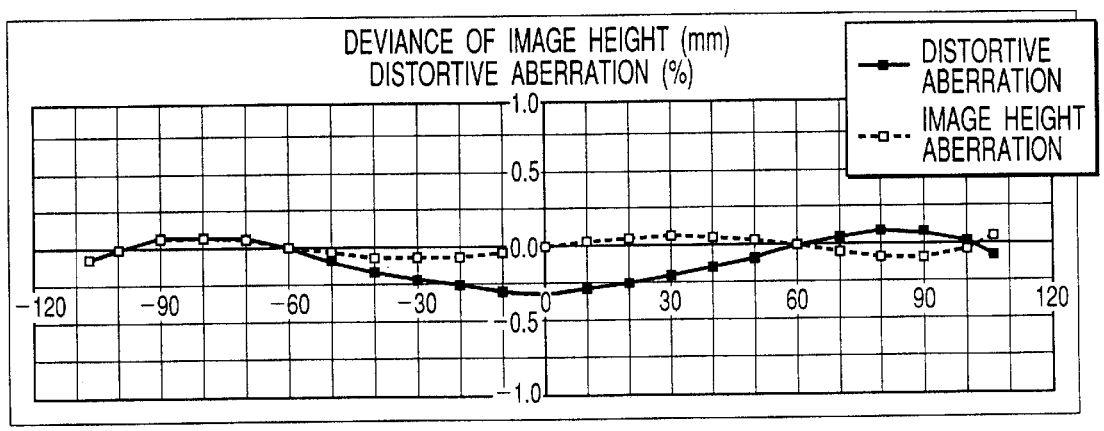
Figure 6C:
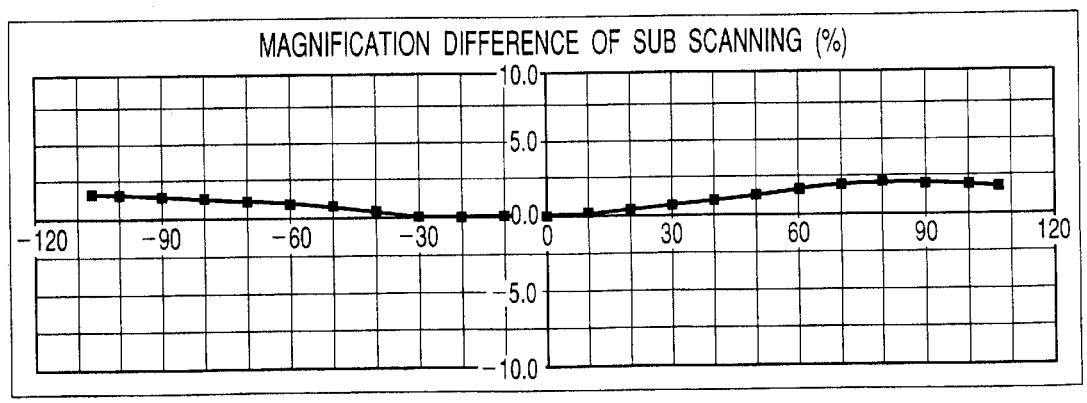

FIGS. 6A, 6B, and 6C are aberration charts showing paraxial aberrations (curvature of image surface, distortive aberration, and magnification difference of sub scanning) in the light scanning device in this embodiment, respectively. In the chart of the curvature of the image surface, the solid line corresponds to the sub scanning direction, and the dotted line corresponds to the main scanning direction. As is obvious from these aberration charts, in this embodiment, the paraxial aberrations are properly corrected, thereby realizing a light scanning device suitable for high-resolution printing.

The Fno ratio in the sub scanning direction is represented by

Fmin/Fmax=0.982≧0.9

This indicates that a predetermined condition for sub scanning magnification is satisfied.

Letting L be the optical path length of the imaging optical system and f be the focal length, 1.35f≦L=1.45≦1.55f The shape of the exit surface in the main scanning direction is so determined as to make the sub scanning magnification uniform, and the relationship between the optical path length and the focal length is so satisfied as to properly correct the curvature of the image surface and f-θ characteristics in the main scanning direction.

Letting φs be the power of the overall imaging optical system in the sub scanning direction, and φs2 be the power of the exit surface (second surface) in the sub scanning direction, 0.9≦φs2/φs≦1.1

By concentrating the power in the sub scanning direction on the exit surface, a system with low arrangement sensitivity of a scanning line bend is realized.

Figure 7:
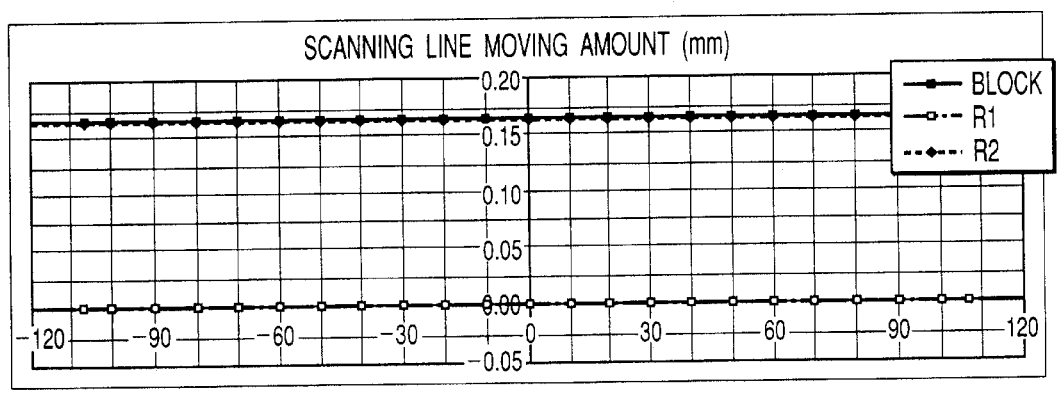
FIG. 7 is a chart showing the arrangement sensitivity of a scanning optical element according to the first embodiment of the present invention.

FIG. 7 shows a scanning line bend amount (excluding the offset amount in the Z direction) in a case wherein the scanning optical element 61 moves in the Z-axis direction perpendicular to the optical axis in a sub scanning cross-section; the moving amount is 0.1 mm. Although both the values are regarded as proper errors in arranging the scanning optical element on the light scanning device, almost no scanning line bend is produced even with this arrangement error; the bend will not reach a level at which a problem arises in the device.

Referring to FIG. 7, the R1 curve represents the scanning line bend amount in a case wherein only the incident surface of the f-θ lens 61 is decentered; the R2 curve, the scanning line bend amount in a case wherein only the exit surface of the f-θ lens 61 is decentered; and the block curve, the scanning line bend amount in a case wherein both the incident surface and the exit surface of the f-θ lens 61 are decentered.

As is obvious from the results shown in FIG. 7, even if the overall scanning lens is decentered in a direction (Z direction) perpendicular to the surface to be scanned due to an error in mounting the lens in the optical box and the manufacturing error of the lens itself, the scanning line on the surface to be scanned can be uniformly shifted to eliminate a scanning line bend due to the decentering by making the sub scanning magnification of the scanning lens substantially uniform.

As is obvious from the results shown in FIG. 7, even if the exit surface is decentered in the Z direction with respect to the incident surface due to insufficient assembly precision in the mold of the mold lens, a scanning line bend due to the decentering in the sub scanning direction on the surface to be scanned can be eliminated by making the sub scanning magnification on each surface of the scanning lens substantially uniform.

In this embodiment, a diffraction grating surface may be formed on at least one surface of one of the first and second optical elements to compensate for the focus movement of the plastic lens, in particular, at the time of a noticeable environment change. In this embodiment, even a light source means formed from a multi-beam laser can be used in the same manner as in the first embodiment described above.

The number of beams that are generated by the multi-beam laser may be two or three or more.

The single lens 61 serving as the scanning optical element in this embodiment may be a glass lens formed by a molding process.

The present invention, however, is not limited to a molded lens, and may be applied to a lens formed by polishing.

Second Embodiment

Figure 8:
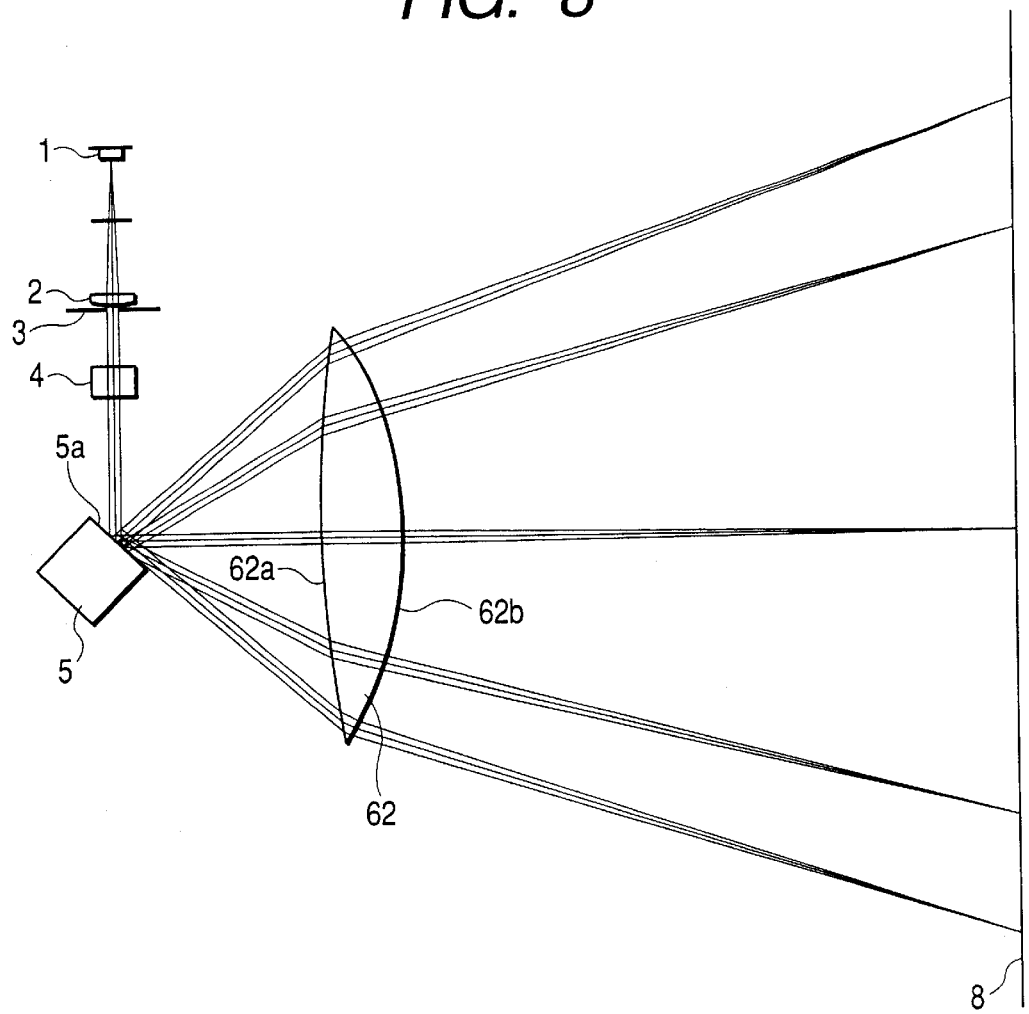
FIG. 8 is a sectional view showing the main part of the second embodiment according to the present invention in the main scanning direction.
Figure 9:
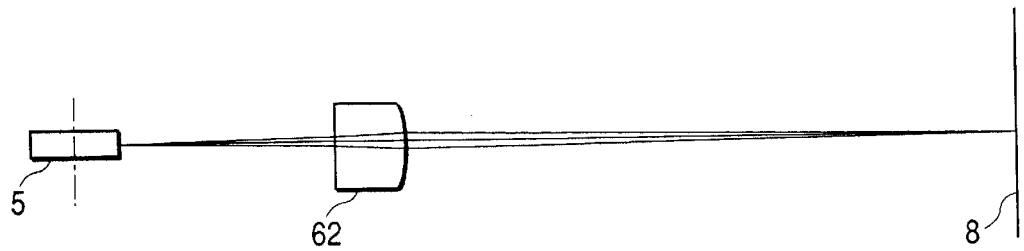
FIG. 9 is a sectional view showing the main part of the second embodiment according to the present invention in the sub scanning direction.

FIG. 8 is a sectional view (main scanning sectional view) of the main part of a light scanning device in the main scanning direction according to the second embodiment of the present invention. FIG. 9 is a sectional view (sub scanning sectional view) of the main part in the sub scanning direction in FIG. 8.

The second embodiment differs from the first embodiment in that the first surface of a scanning imaging element 62 has weak positive power in the sub scanning direction. Although the sub scanning power share ratio differs from that in the first embodiment, the second embodiment exhibits good aberration characteristics and satisfactory imaging characteristics.

FIG. 10 shows coefficients representing the aspherical coefficients of the scanning optical element 61 and other characteristics in this embodiment.

Figure 11A:
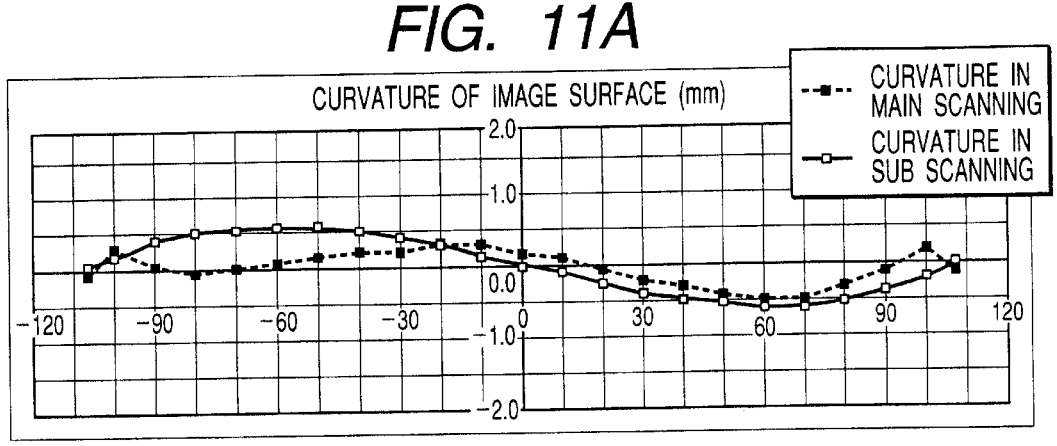
FIGS. 11A, 11B and 11C are aberration charts showing paraxial aberrations (curvature of image surface, distortive aberration, and magnification difference of sub scanning) in the second embodiment of the present invention.
Figure 11B:
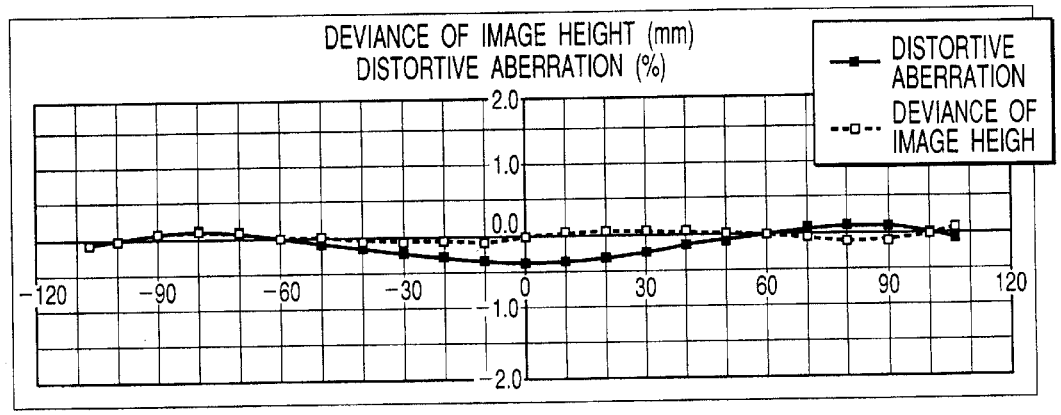
Figure 11C:
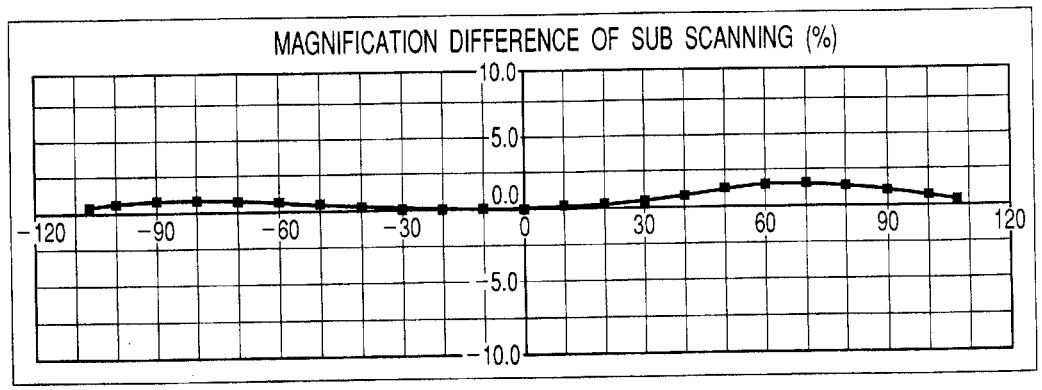

FIGS. 11A, 11B, and 11C are aberration charts showing paraxial aberrations (curvature of image surface, distortive aberration, and magnification difference of sub scanning) in the light scanning device in this embodiment, respectively. In the chart of the curvature of the image surface, the solid line corresponds to the sub scanning direction, and the dotted line corresponds to the main scanning direction. As is obvious from these aberration charts, in this embodiment, the paraxial aberrations are properly corrected, thereby realizing a light scanning device suitable for high-resolution printing.

In the scanning optical device according to this embodiment, the main scanning shape is the same as that in the first embodiment, and the coordinates of each principal ray and the light beam distance to each surface are the same as those in FIG. 5. The equivalent air distance (calculated in terms of real distance/refraction factor inside the lens) from a deflecting surface 5a of a polygon mirror on the optical axis to an exit surface 62b of the scanning optical element 62 is given by $L_{ao}$=63.193 mm, the distance from the exit surface 62b of the scanning optical element 62 to the surface 8 to be scanned is given by $L_{bo}$=147.283 mm, the equivalent air distance from the deflecting surface 5a of the polygon mirror at an off-axis position to the exit surface 62b of the scanning optical element 62 is given by $L_{a\theta}$=72.843 mm, and the distance from the exit surface 62b of the scanning optical element 62 to the surface 8 to be scanned is given by $L_{b\theta}$=170.742 mm. The shapes (meridional shapes) of the two surfaces 62a and 62b (the exit surface 62b, in particular) in the main scanning direction are determined to satisfy the following conditions:

$$\frac{L_{b\theta}}{L_{a\theta}} = 1.0057 \times \frac{L_{bo}}{L_{ao}} \quad \text{(a)}$$

$$0.9 \times \frac{L_{bo}}{L_{ao}} \leq \frac{L_{b\theta}}{L_{a\theta}} \leq 1.1 \times \frac{L_{bo}}{L_{ao}} \quad \text{(b)}$$

The Fno ratio in the sub scanning direction is represented by

Fmin/Fmax=0.984≧0.9

This indicates that a predetermined condition for sub scanning magnification is satisfied.

Letting L be the optical path length of the imaging optical system and f be the focal length, $$1.35f \leq L=1.45 \leq 1.55f$$

The shape of the exit surface in the main scanning direction is so determined as to make the sub scanning magnification uniform, and the relationship between the optical path length and the focal length is so satisfied as to properly correct the curvature of the image surface and f-θ characteristics in the main scanning direction.

Letting $\phi s$ be the power of the overall imaging optical system in the sub scanning direction, and $\phi s2$ be the power of the exit surface (second surface) in the sub scanning direction, $$0.9 \leq \phi s2/\phi s = 0.929 \leq 1.1$$

By concentrating the power in the sub scanning direction on the exit surface, a system with low arrangement sensitivity of a scanning line bend is realized.

Figure 12:
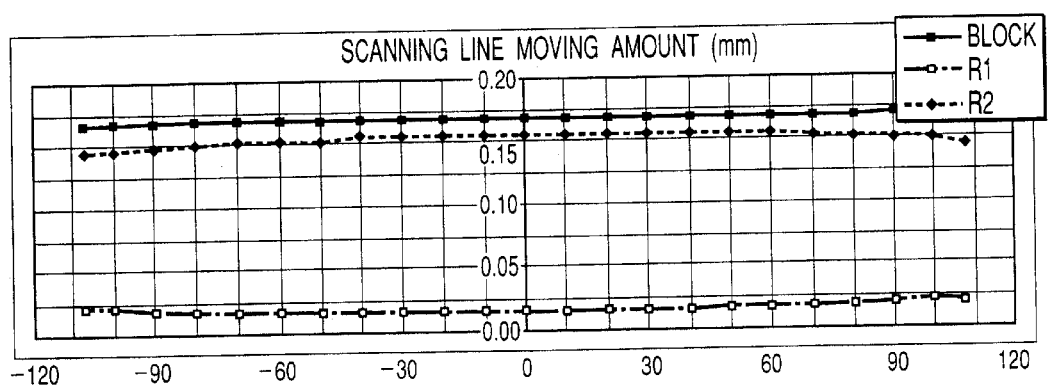
FIG. 12 is a chart showing the arrangement sensitivity of a scanning optical element according to the second embodiment of the present invention.

FIG. 12 shows a scanning line bend amount (excluding the offset amount in the Z direction) in a case wherein the scanning optical element 62 moves in the Z-axis direction perpendicular to the optical axis in a sub scanning cross-section; the moving amount is 0.1 mm. Although both the values are regarded as proper errors in arranging the scanning optical element on the light scanning device, almost no scanning line bend is produced even with this arrangement error; the bend will not reach a level at which a problem arises in the device.

Third Embodiment

Figure 13:
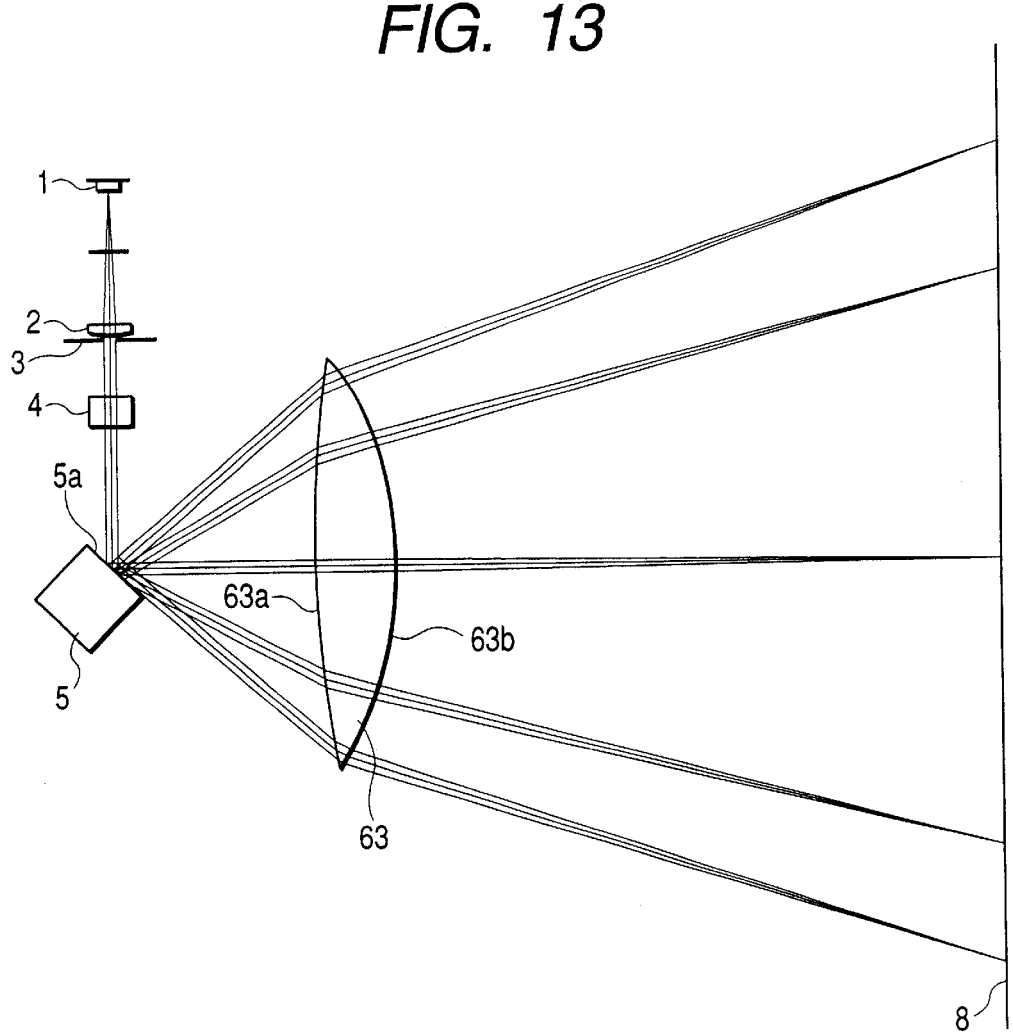
FIG. 13 is a sectional view showing the main part of the third embodiment according to the present invention in the main scanning direction.
Figure 14:
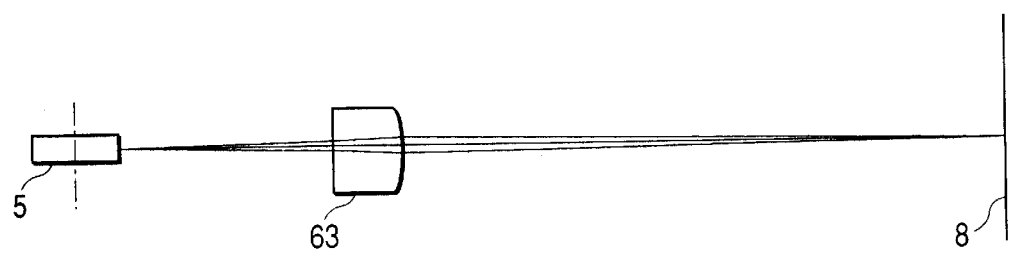
FIG. 14 is a sectional view showing the main part of the third embodiment according to the present invention in the sub scanning direction.

FIG. 13 is a sectional view (main scanning sectional view) of the main part of a light scanning device in the main scanning direction according to the third embodiment of the present invention. FIG. 14 is a sectional view (sub scanning sectional view) of the main part in the sub scanning direction in FIG. 12.

The third embodiment differs from the first embodiment in that the first surface of a scanning imaging element 63 has weak negative power in the sub scanning direction. Although the sub scanning power share ratio differs from that in the first embodiment, the second embodiment exhibits good aberration characteristics and satisfactory imaging characteristics.

FIG. 15 shows coefficients representing the aspherical coefficients of the scanning optical element 63 and other characteristics in this embodiment.

Figure 16A:
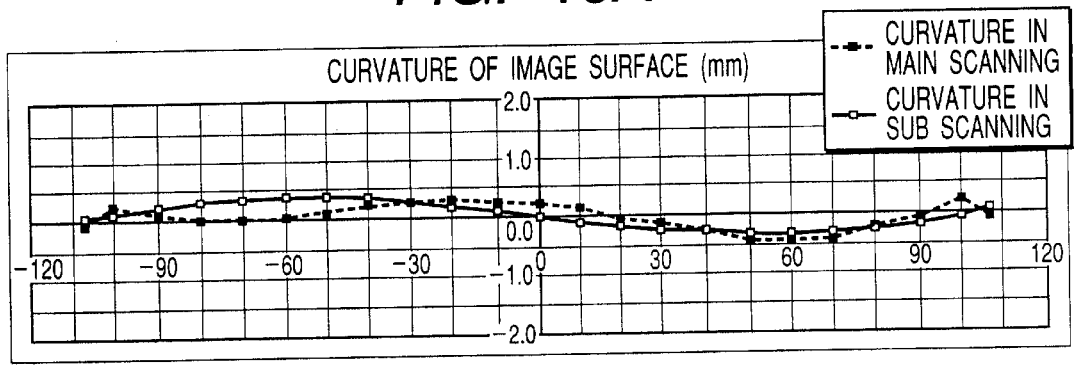
FIGS. 16A, 16B and 16C are aberration charts showing paraxial aberrations (curvature of image surface, distortive aberration, and magnification difference of sub scanning) in the third embodiment of the present invention.
Figure 16B:
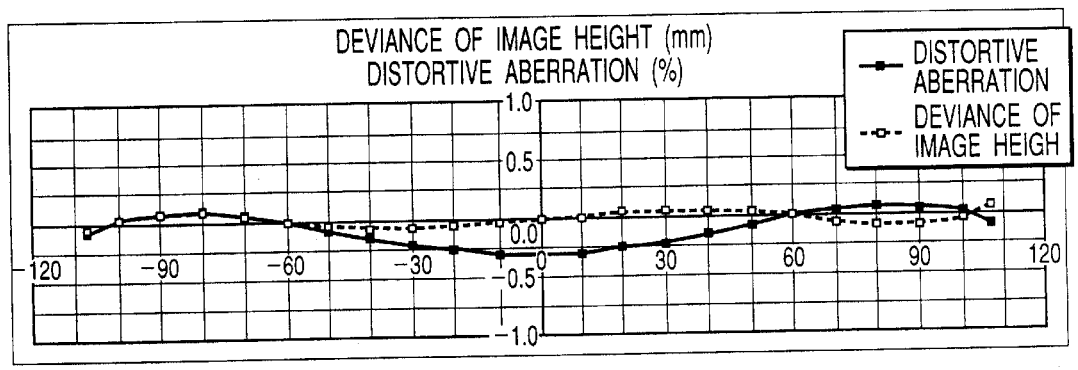
Figure 16C:
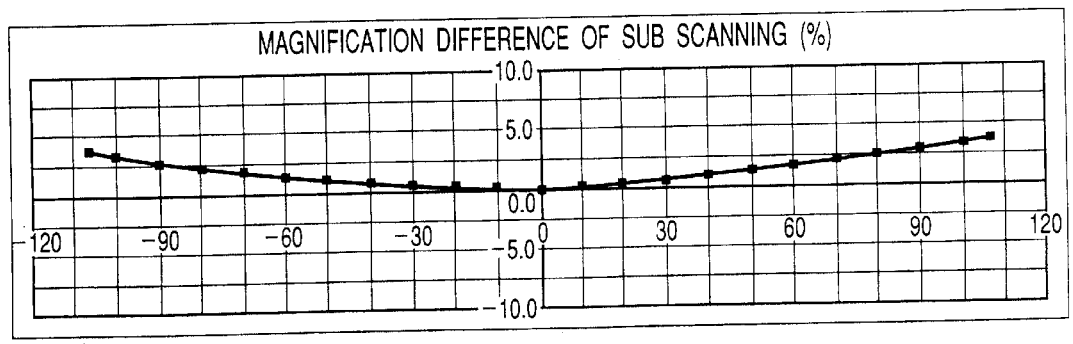
Figure 17:
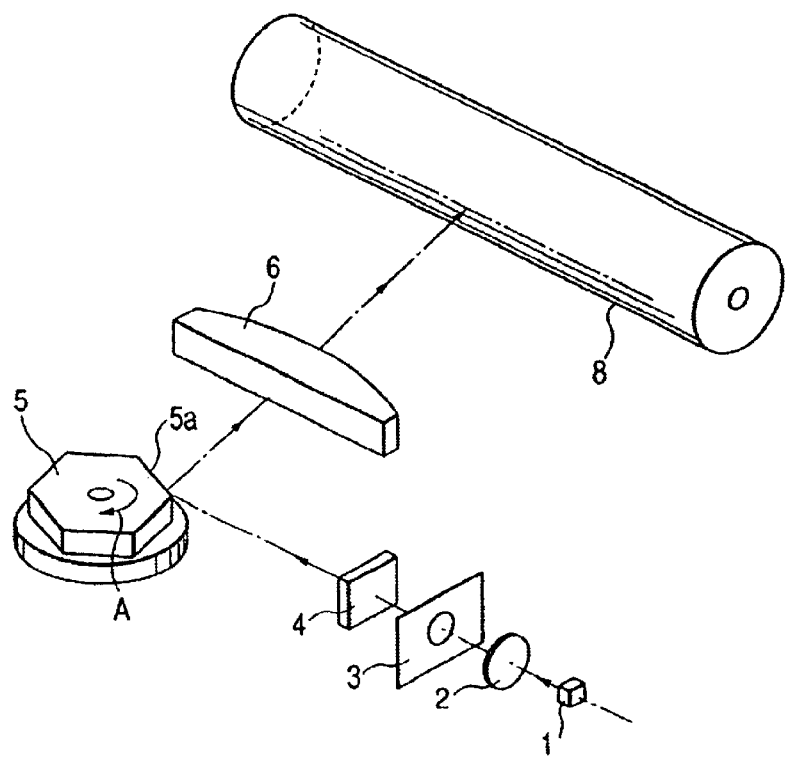
FIG. 17 is a schematic view showing the main part of a conventional light scanning device.
Figure 18:
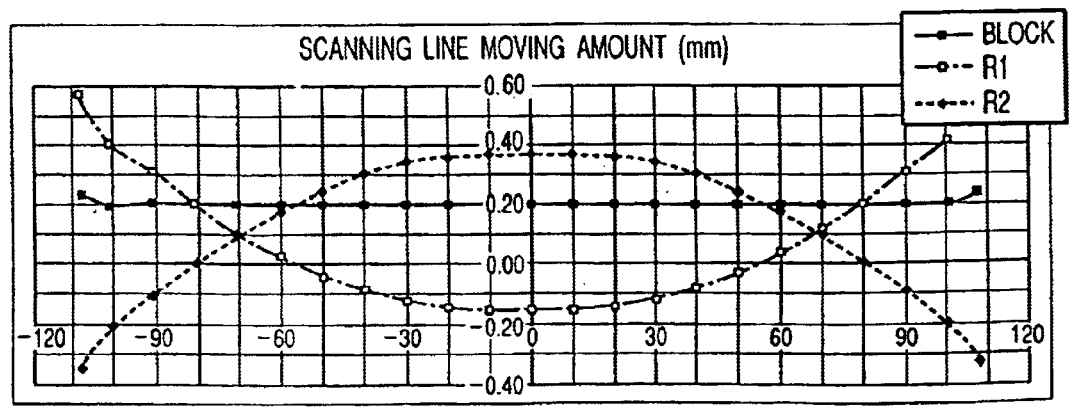
FIG. 18 is a chart showing the arrangement sensitivity of the conventional scanning optical device.

FIGS. 16A, 16B, and 16C are aberration charts showing paraxial aberrations (curvature of image surface, distortive aberration, and magnification difference of sub scanning) in the light scanning device in this embodiment, respectively. In the chart of the curvature of the image surface, the solid line corresponds to the sub scanning direction, and the dotted line corresponds to the main scanning direction. As is obvious from these aberration charts, in this embodiment, the paraxial aberrations are properly corrected, thereby realizing a light scanning device suitable for high-resolution printing.

In the scanning optical device according to this embodiment, the main scanning shape is the same as that in the first embodiment, and the coordinates of each principal ray and the light beam distance to each surface are the same as those in FIG. 5. The equivalent air distance (calculated in terms of real distance/refraction factor inside the lens) from a deflecting surface 5a of a polygon mirror on the optical axis to an exit surface 63b of the scanning optical element 63 is given by $L_{ao}$=63.193 mm, the distance from the exit surface 63b of the scanning optical element 63 to the surface 8 to be scanned is given by $L_{bo}$=147.283 mm, the equivalent air distance from the deflecting surface 5a of the polygon mirror at an off-axis position to the exit surface 63b of the scanning optical element 63 is given by $L_{a\theta}$=72.843 mm, and the distance from the exit surface 63b of the scanning optical element 63 to the surface 8 to be scanned is given by $L_{b\theta}$=170.742 mm. The shapes (meridional shapes) of the two surfaces 63a and 63b (the exit surface 63b, in particular) in the main scanning direction are determined to satisfy the following conditions:

$$\frac{L_{b\theta}}{L_{a\theta}} = 1.0057 \times \frac{L_{bo}}{L_{ao}} \qquad (a)$$

$$0.9 \times \frac{L_{bo}}{L_{ao}} \leq \frac{L_{b\theta}}{L_{a\theta}} \leq 1.1 \times \frac{L_{bo}}{L_{ao}} \qquad (b)$$

The Fno ratio in the sub scanning direction is represented by $$\text{Fmin/Fmax} = 0.965 \geq 0.9$$

This indicates that a predetermined condition for sub scanning magnification is satisfied.

Letting L be the optical path length of the imaging optical system and f be the focal length, $$1.35f \leq L=1.45 \leq 1.55f$$

The shape of the exit surface in the main scanning direction is so determined as to make the sub scanning magnification uniform, and the relationship between the optical path length and the focal length is so satisfied as to properly correct the curvature of the image surface and f-θ characteristics in the main scanning direction.

Letting $\phi s$ be the power of the overall imaging optical system in the sub scanning direction, and $\phi s2$ be the power of the exit surface (second surface) in the sub scanning direction, $$0.9 \leq \phi s2/\phi s = 1.085 \leq 1.1$$

By concentrating the power in the sub scanning direction on the exit surface, a system with low arrangement sensitivity of a scanning line bend is realized.

Although a scanning line bend amount in a case wherein the scanning optical element 63 moves in the Z-axis direction perpendicular to the optical axis in a sub scanning cross-section is not shown, almost no scanning line bend is produced as in the case shown in FIGS. 7 and 12, and the scanning line bend will not reach a level at which a problem arises in the device.

Image Forming Apparatus

Figure 19:
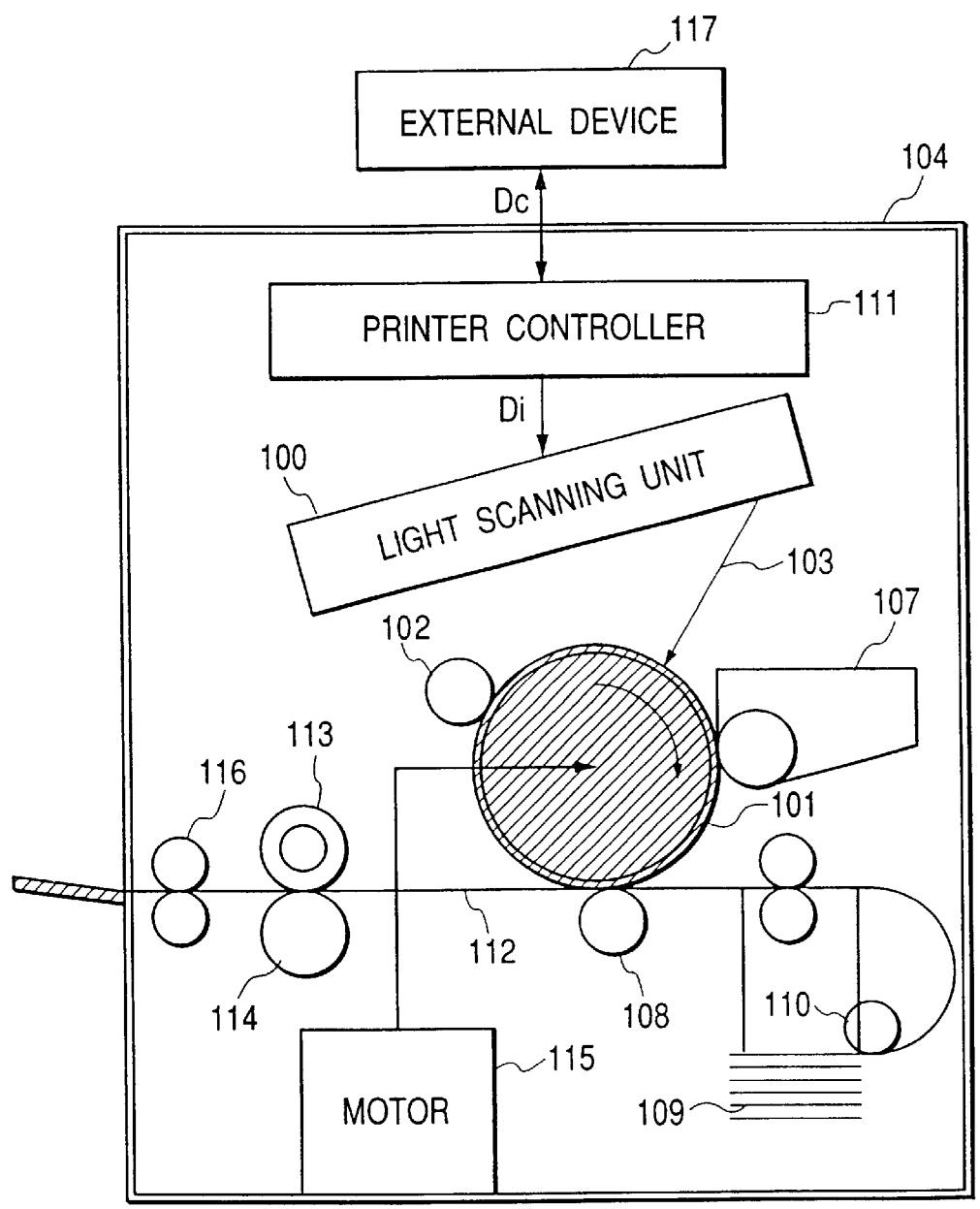
FIG. 19 is a sectional view showing the main part of an image forming apparatus (electrophotograhic printer) in the sub scanning direction, which uses the scanning optical device according to the present invention.

FIG. 19 is a sectional view showing the main part of an image forming apparatus (electrophotographic printer) in a sub-scanning cross-section, which uses the scanning optical system according to the first to third embodiments described above. Referring to FIG. 19, an image forming apparatus 104 receives code data Dc from an external device 117 such as a personal computer. This code data Dc is converted into image data (dot data) Di by the printer controller 111 in the apparatus. The image data Di is input to a light scanning unit 100 having the arrangement exemplified by each of the first, second, and third embodiments. A light beam 103 modulated in accordance with the image data Di emerges from the light scanning unit (light scanning optical) 100. The photosensitive surface of a photosensitive drum 101 is scanned with this light beam 103 in the main scanning direction.

The photosensitive drum 101 serving as an electrostatic latent image bearing member is rotated clockwise by a motor 115. With this rotation, the photosensitive surface of the photosensitive drum 101 moves in the sub-scanning direction perpendicular to the main scanning direction. A charge roller 102 is placed above the surface of the photosensitive drum 101 to be in contact with its surface so as to uniformly charge it. The surface of the photosensitive drum 101 charged by the charge roller 102 is irradiated with the light beam 103 scanned by the light scanning unit 100.

As described, the light beam 103 is modulated on the basis of the image data Di. By irradiating the surface of the photosensitive drum 101 with this light beam 103, an electrostatic latent image is formed on the surface. This electrostatic latent image is developed into a toner image by a developing device 107 placed downstream from the irradiation position of the light beam 103 within a rotating cross-section of the photosensitive drum 101 so as to be in contact with the photosensitive drum 101. In this case, toner particles having an opposite polarity to that of charge generated by the charge roller 102 are used. The toner adheres to an unexposed portion (image portion) of the photosensitive drum. That is, in this embodiment, so-called normal developing is performed. Note that reversal developing may be performed in this embodiment, in which the toner adheres to an exposed portion of the photosensitive drum.

The toner image developed by the developing device 107 is transferred onto a paper sheet 112 serving as a transfer member by a transferring roller (transferring device) 108. The paper sheet 112 is stored in a paper cassette 109 in front of the photosensitive drum 101 (on the right side in FIG. 19). However, a paper sheet can also be fed manually. A pickup roller 110 is placed at an end portion of the paper cassette 109 to feed the paper sheet 112 from the paper cassette 109 into a convey path.

In the above manner, the paper sheet 112 on which the unfixed toner image is transferred is conveyed to a fixing device behind the photosensitive drum 101 (on the left side in FIG. 19). The fixing device is constituted by a fixing roller 113 incorporating a fixing heater (not shown) and a press roller 114 placed in contact with the fixing roller 113. The fixing device fixes the unfixed toner image on the paper sheet 112 by heating the paper sheet 112 conveyed from the transferring unit while pressing it between the fixing roller 113 and the press portion of the press roller 114. Furthermore, the image-fixed paper sheet 112 is discharged from the image forming apparatus by using a sheet discharging roller 116 placed behind the fixing roller 113.

Although not shown in FIG. 19, the printer controller 111 controls the respective units in the image forming apparatus including the motor 115 and the polygon motor in the light scanning unit 100 as well as the data conversion described above.

Color Image Forming Apparatus

Figure 20:
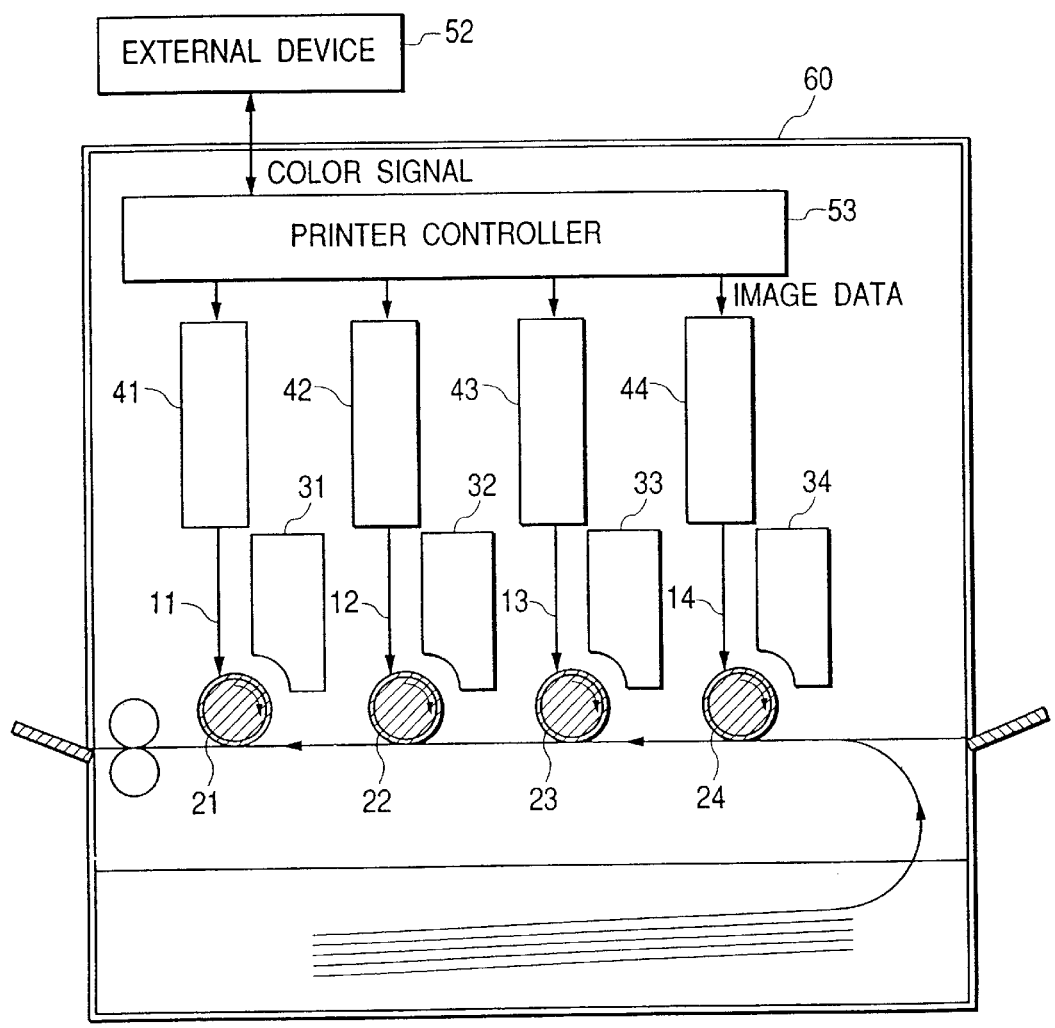
FIG. 20 is a view showing the main part of a color image forming apparatus according to the present invention.

FIG. 20 is a schematic view showing the main part of a color image forming apparatus of the tandem type which simultaneously uses a plurality of light scanning devices each identical to the light scanning device according to one of the first to third embodiments described above, and records pieces of image information in the respective colors on different photosensitive surfaces, thereby forming a color image.

Referring to FIG. 20, color image forming apparatus 60 includes printer controller 53 having a connection to external device 52, light scanning devices 41, 42, 43 and 44 each identical to the light scanning device of one of the first to third embodiments, photosensitive drums 21, 22, 23 and 24 serving as image bearing members, developing devices 31, 32, 33 and 34, and conveyer belt 45. As seen in FIG. 20, light beams 11, 12, 13 and 14 are emitted from light scanning devices 41, 42, 43 and 44.

In the color image forming apparatus in FIG. 20, four light scanning devices (41, 42, 43, and 44) each identical to the light scanning device according to one of the first to third embodiments are arranged in correspondence with C (cyan), M (magenta), Y (yellow), and B (black), image signals are concurrently recorded on the respective photosensitive drums (21, 22, 23, and 24), and the recorded images are superimposed/transferred onto a recording medium, thereby printing one full-color image at high speed.

The present invention can also be applied to a form in which two imaging optical systems correspond to one deflecting means, and two units having photosensitive devices corresponding to each imaging optical system are arranged.

In addition, the present invention can be applied to a form in which two imaging optical systems correspond to one deflecting means, and two photosensitive devices correspond to each imaging optical system.

By forming a color image forming apparatus using a plurality of light scanning devices in this manner, an increase in processing speed can be attained, and a high-quality color image with little color misregistration can be obtained.

According to the present invention, a light scanning device capable of suppressing a scanning line bend to a low level, which is caused by the arrangement error of an optical element, and an image forming apparatus using the device can be realized by forming the optical element from a single lens, determining the shape of the exit surface of the scanning optical element in the main scanning direction so as to make the sub scanning magnification uniform, and substantially concentrating the power in the sub scanning direction on the exit surface of the scanning optical element.

What is claimed is:

1. A light scanning device comprising:

a light source means;

a deflecting element;

an incident optical system for guiding a light beam emitted from said light source means to said deflecting element; and an imaging optical system for forming the light beam deflected by the deflecting element into an image on a surface to be scanned, wherein, said imaging optical system is formed from a single lens, a cross-sectional shape of an exit surface of said single lens in a main scanning direction is an arc shape, power of the exit surface in a sub scanning direction within the image effective area satisfies $0.9 \leq \Phi s2/\Phi s \leq 1.1$ where $\Phi s$ is power of an overall imaging optical system in the sub scanning direction and $\Phi s2$ is power of the exit surface in the sub scanning direction, and the arc shape in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of said single lens, $L_{bo}$ is a distance from the exit surface of said single lens to the surface to be scanned, $L_{a\theta}$ is an equivalent air distance from the deflecting means at an off-axis position to the exit surface of said single lens, and $L_{b\theta}$ is a distance from the exit surface of said single lens to the surface to be scanned.

2. A light scanning device according to claim 1, wherein the power of the exit surface in the sub scanning direction or/and the power of the incident surface in the sub scanning direction changes without correlating to a shape in the main scanning direction.

3. A light scanning device according to claim 1, wherein a radius of curvature of the exit surface in the sub scanning direction changes from an on-axis position to an off-axis position.

4. A light scanning device according to claim 1, wherein the incident and exit surfaces are anamorphic surfaces.

5. A light scanning device according to claim 1, wherein the shape of the incident surface in the main scanning direction is aspherical.

6. A light scanning device according to claim 1, wherein letting L be an optical path length of said imaging optical system, and f be a focal length, the optical path length and focal length satisfy $$1.35f \leq L \leq 1.55f,$$

wherein said optical path length is a distance from a deflection point on a deflected element to an imaging point on a surface to be scanned.

7. A light scanning device according to claim 1, wherein, of the lens shape of said imaging optical system in the main scanning direction, there is no inflection point in a curvature change on a surface which uses an aspherical surface.

8. A light scanning device according to claim 1, wherein said imaging optical system is manufactured by plastic molding.

9. A light scanning device according to claim 1, wherein a multi-beam laser is used as a light source of said imaging optical system.

10. A light scanning device according to claim 1, wherein the power of the exit surface in the sub scanning direction satisfies $0.95 \leq \Phi s2/\Phi s \leq 1.05$ where $\Phi s$ is power of the overall imaging optical system in the sub scanning direction and $\Phi s2$ is power of the exit surface in the sub scanning direction.

11. A light scanning device according to claim 1, wherein the arc shape in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of said single lens, $L_{bo}$ is the distance from the exit surface of said single lens to the surface to be scanned, $L_{a\theta}$ is the equivalent air distance from the deflecting means at an off-axis position to the exit surface of said single lens, and $L_{b\theta}$ is the distance from the exit surface of said single lens to the surface to be scanned.

12. A light scanning device according to claim 1, wherein the shape of the exit surface of said single lens is an arc shape.

13. A light scanning device according to claim 1, wherein the shape of the incident surface of said single lens within a sub scanning cross-section is flat.

14. An image forming apparatus comprising said light scanning device according to any one of claims 1 to 13, a photosensitive device placed on the surface to be scanned, a developing device for developing an electrostatic latent image formed on said photosensitive device by a light beam scanned by said light scanning device as a toner image, a transferring device for transferring the developed toner image onto a transfer medium, and a fixing device for fixing the transferred toner image on the transfer medium.

15. An image forming apparatus characterized by comprising said light scanning device according to any one of claims 1 to 13, and a printer controller for converting code data input from an external device into an image signal, and inputting the signal to said light scanning device.

16. An image forming apparatus comprising a plurality of imaging optical systems according to any one of claims 1 to 13, each of said imaging optical systems recording image information on photosensitive devices corresponding to each color or a plurality of colors.

17. A light scanning device comprising:
light source means;
a deflecting element;
an incident optical system for guiding a light beam emitted from said light source means to said deflecting element;
an imaging optical system for forming the light means deflected by the deflecting element into an image on a surface to be scanned, wherein,
said imaging optical system is formed from a single lens formed by a molding process, a cross-sectional shape of an exit surface of said single lens in a main scanning direction is an arc shape, power of the exit surface in a sub scanning direction within the image effective area satisfies $0.9 \leq \Phi s2/\Phi s \leq 1.1$ where $\Phi s$ is power of the overall imaging optical system in the sub scanning direction and $\Phi s2$ is power of the exit surface in the sub scanning direction, and the arc shape in the main scanning direction satisfies $$0.9 \times \frac{L_{bo}}{L_{ao}} \leq \frac{L_{b\theta}}{L_{a\theta}} \leq 1.1 \times \frac{L_{bo}}{L_{ao}}$$

where $L_{ao}$ is an equivalent air distance from the deflecting means on an optical axis to the exit surface of said single lens, $L_{bo}$ is a distance from the exit surface of said single lens to the surface to be scanned, $L_{a\theta}$ is an equivalent air distance from the deflecting means at an off-axis position to the exit surface of said single lens, and $L_{b\theta}$ is a distance from the exit surface of said single lens to the surface to be scanned.

18. A light scanning device according to claim 17, wherein the power of the exit surface in the sub scanning direction or/and the power of the incident surface in the sub scanning direction changes without correlating to a shape in the main scanning direction.

19. A light scanning device according to claim 17, wherein a radius of curvature of the exit surface in the sub scanning direction changes from an on-axis position to an off-axis position.

20. A light scanning device according to claim 17, wherein the incident and exit surfaces are anamorphic surfaces.

21. A light scanning device according to claim 17, wherein the shape of the incident surface in the main scanning direction is aspherical.

22. A light scanning device according to claim 17, wherein letting L be an optical path length of said imaging optical system, and f be a focal length, the optical path length and focal length satisfy $$1.35f \leq L \leq 1.55f,$$

wherein said optical path length is a distance from a deflection point on a deflected element to an imaging point on a surface to be scanned.

23. A light scanning device according to claim 17, wherein, of the lens shape of said imaging optical system in the main scanning direction, there is no inflection point in a curvature change on a surface which uses an aspherical surface.

24. A light scanning device according to claim 17, wherein said imaging optical system is manufactured by plastic molding.

25. A light scanning device according to claim 17, wherein a multi-beam laser is used as a light source of said imaging optical system.

26. A light scanning device according to claim 17, wherein the power of the exit surface in the sub scanning direction satisfies $0.95 \leq \Phi s2/\Phi s \leq 1.05$ where $\Phi s$ is power of the overall imaging optical system in the sub scanning direction and $\Phi s2$ is power of the exit surface in the sub scanning direction.

27. A light scanning device according to claim 17, wherein the arc shape in the main scanning direction satisfies $$0.95 \times \frac{L_{bo}}{L_{ao}} \leq \frac{L_{b\theta}}{L_{a\theta}} \leq 1.05 \times \frac{L_{bo}}{L_{ao}}$$

where $L_{ao}$ is the equivalent air distance from the deflecting means on the optical axis to the exit surface of said single lens, $L_{bo}$ is the distance from the exit surface of said single lens to the surface to be scanned, $L_{a\theta}$ is the equivalent air distance from the deflecting means at an off-axis position to the exit surface of said single lens, and $L_{b\theta}$ is the distance from the exit surface of said single lens to the surface to be scanned.

28. A light scanning device according to claim 17, wherein the shape of the exit surface of said single lens is an arc shape.

29. A light scanning device according to claim 17, wherein the shape of the incident surface of said single lens within a sub scanning cross-section is flat.

30. An image forming apparatus comprising said light scanning device according to any one of claims 17 to 29, a photosensitive device placed on the surface to be scanned, a developing device for developing an electrostatic latent image formed on said photosensitive device by a light beam scanned by said light scanning device as a toner image, a transferring device for transferring the developed toner image onto a transfer medium, and a fixing device for fixing the transferred toner image on the transfer medium.

31. An image forming apparatus comprising said light scanning device according to any one of claims 17 to 29, and a printer controller for converting code data input from an external device into an image signal, and inputting the signal to said light scanning device.

32. An image forming apparatus comprising a plurality of imaging optical systems according to any of claims 17 to 29, each of said imaging optical systems recording image information on photosensitive devices corresponding to each color or a plurality of colors.

* * * * *